(12) United States Patent
Paget

(10) Patent No.: US 9,439,538 B2
(45) Date of Patent: Sep. 13, 2016

(54) LOCKING RING

(71) Applicant: Whirlpool Corporation, Benton Harbor, MI (US)

(72) Inventor: Paul S. Paget, Benton Harbor, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 414 days.

(21) Appl. No.: 13/960,841

(22) Filed: Aug. 7, 2013

(65) Prior Publication Data

US 2015/0041577 A1  Feb. 12, 2015

(51) Int. Cl.
| | |
|---|---|
| *A47J 43/00* | (2006.01) |
| *A47J 43/07* | (2006.01) |
| *B65B 7/28* | (2006.01) |
| *B65D 51/14* | (2006.01) |
| *A47J 36/10* | (2006.01) |

(52) U.S. Cl.
CPC .............. *A47J 43/0716* (2013.01); *A47J 36/10* (2013.01); *A47J 43/0727* (2013.01); *B65B 7/2842* (2013.01); *B65D 51/14* (2013.01)

(58) Field of Classification Search
CPC ...... A47J 43/0727; A47J 43/07; A47J 43/00; A47J 36/10
USPC .............................. 241/282.1, 282.2, 37.5, 92
See application file for complete search history.

(56) References Cited

U.S. PATENT DOCUMENTS

| | | | |
|---|---|---|---|
| 2,720,329 A | 10/1955 | Kochner | |
| 3,105,621 A | 10/1963 | Francis | |
| 4,482,083 A | 11/1984 | Beck | |
| 5,014,866 A | 5/1991 | Moore | |
| 5,150,803 A | 9/1992 | Cartellone | |
| 5,368,186 A | 11/1994 | Yeh | |
| 6,945,688 B2 | 9/2005 | Huyser et al. | |
| 7,275,666 B2 | 10/2007 | Rukavina et al. | |
| 7,753,223 B2 | 7/2010 | Boozer et al. | |
| 8,733,575 B2 * | 5/2014 | Krasznai | A47J 36/06 220/212 |
| 2005/0068846 A1 | 3/2005 | Wulf et al. | |
| 2008/0041869 A1 | 2/2008 | Backaert | |
| 2011/0174905 A1 * | 7/2011 | Chan | A47J 43/0716 241/37.5 |
| 2012/0027902 A1 | 2/2012 | Audette et al. | |
| 2012/0294108 A1 | 11/2012 | Dickson, Jr. et al. | |

FOREIGN PATENT DOCUMENTS

| | | | |
|---|---|---|---|
| EP | 1479947 A1 | 11/2004 | |
| FR | 2769197 A1 * | 4/1999 | A47J 36/10 |

OTHER PUBLICATIONS

European Patent Application No. 14177672.4 filed Jul. 18, 2014, applicant: Whirlpool Europe Srl, European Search Report re: same, mail date Nov. 10, 2014.

* cited by examiner

*Primary Examiner* — Faye Francis

(57) ABSTRACT

A food processing machine, having a jar with a base and at least one sidewall extending upwardly therefrom to define a top opening. A lid has a bottom surface with a downwardly depending sealing wall. An outer surface of the downwardly depending sealing wall corresponds to the top opening. A resiliently collapsible locking ring is removably positionable radially inward from the sealing wall and applies a radially outwardly directed force against the sealing wall when positioned radially inwardly therefrom. The resiliently collapsible locking ring is collapsed and then positioned in a receiving portion radially inward from the sealing wall. The lid is then positioned at the top opening of the jar, with the sealing wall inserted into the top opening. The sealing wall applies a radially outwardly directed force against the at least one wall to seal the lid to the jar.

7 Claims, 7 Drawing Sheets

LOCKING RING

BACKGROUND

The present concept generally relates to a removable locking ring for use with a lid to secure the lid to a jar of a food processing machine.

SUMMARY

One embodiment of the present disclosure includes a food processing machine. The food processing machine has a jar with a base and at least one sidewall extending upwardly from the base and defining a top opening of the jar. A lid has a bottom surface with a downwardly depending sealing wall. An outer surface of the sealing wall corresponds to an interior surface of the top opening. A resiliently collapsible locking ring is operable between a collapsed and an expanded position. The locking ring is removably positionable radially inward from the sealing wall, and the locking ring applies a radially outwardly directed force against the sealing wall when it is positioned radially inwardly therefrom.

Another embodiment of the present disclosure includes a locking ring for a lid of a food processing machine. The locking ring is a resiliently collapsible ring which is adapted to be removably positionable radially inwardly from a depending sealing wall of the lid, and to apply a radially outwardly directed force against the sealing wall.

Yet another embodiment of the present disclosure includes a method of sealing a jar of a food processing machine, where the jar includes at least one sidewall defining a top opening to the jar. The method includes the step of placing a locking ring radially inwardly from a sealing wall, which depends downwardly from a lid. The method further includes the step of positioning an outer surface of the sealing wall adjacent to an interior surface of the at least one sidewall.

Using an embodiment of a lid and locking ring according to the current disclosure ensures that the jar is securely sealed, and the contents of the jar are not thrown from the jar when the food processing machine is operated. Additionally, the locking ring and lid described herein are easily assembled and disassembled for cleaning, storage, and use.

These and other features, advantages, and objects of the present device will be further understood and appreciated by those skilled in the art upon studying the following specification, claims, and appended drawings.

DETAILED DESCRIPTION OF EMBODIMENTS

Figure 1:
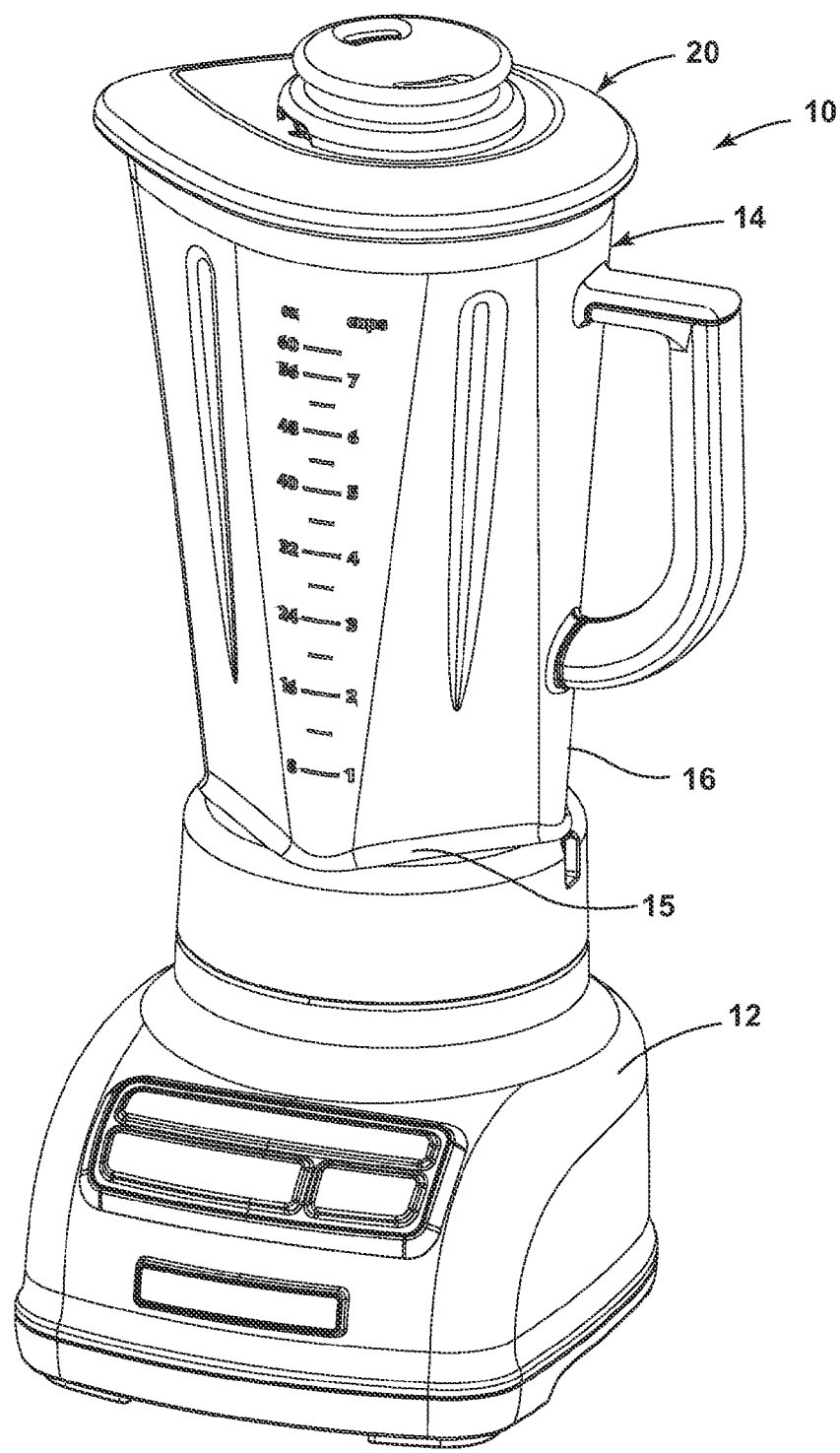
FIG. 1 is a top perspective view of an embodiment of a blender according to the present disclosure.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
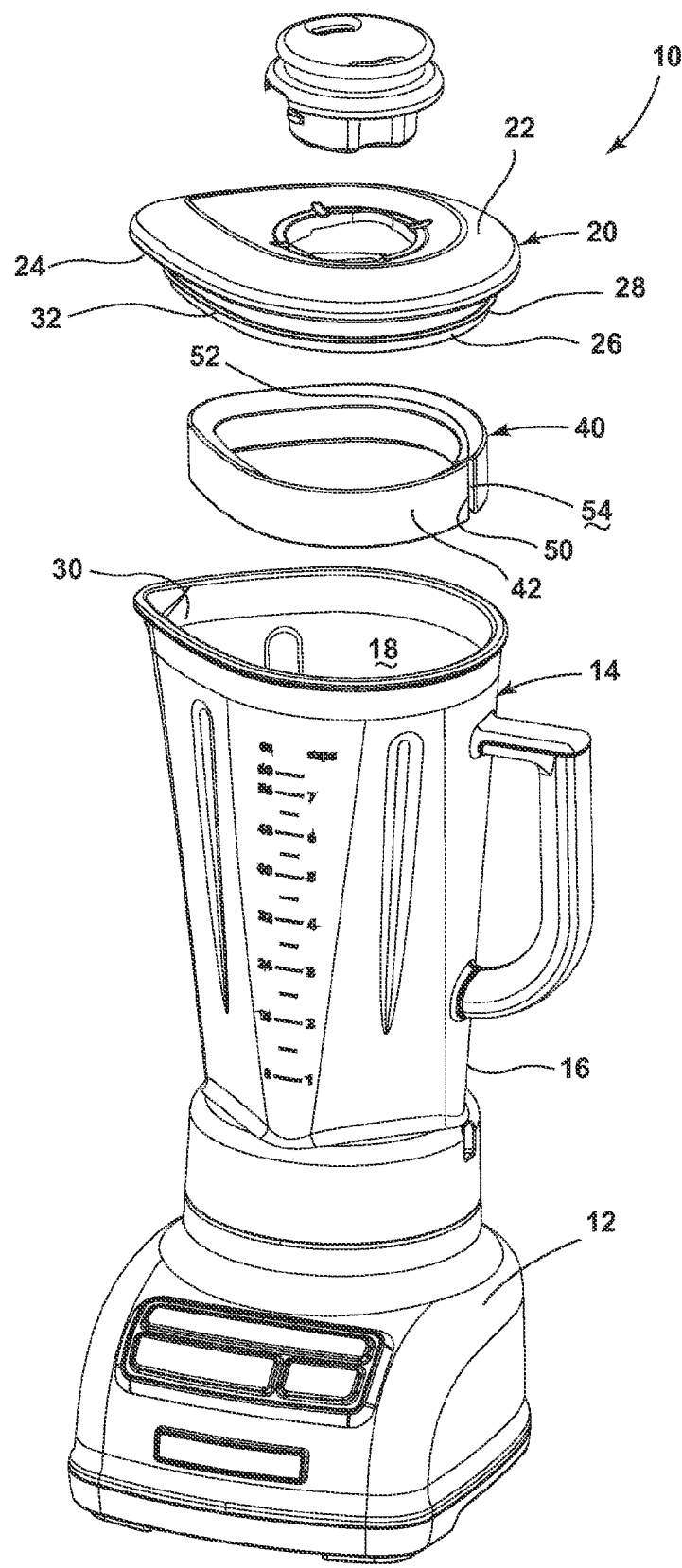
FIG. 2 is an exploded top perspective view of the embodiment shown in FIG. 1.

In one embodiment, as shown in FIGS. 1-2, a blender 10 includes a motor housing 12 and a jar 14 which is operably affixed to the motor housing 12. The jar 14 has a base 15 with at least one sidewall 16 extending upwardly therefrom and defining a top opening 18. A lid 20 seals the top opening 18, and prevents contents of the blender 10 from being thrown from the jar 14 when the blender 10 is operated. Although a blender 10 is shown in the particular embodiments depicted, it is understood that alternate food processing machines would also be included within the scope of the present disclosure.

Figure 3:
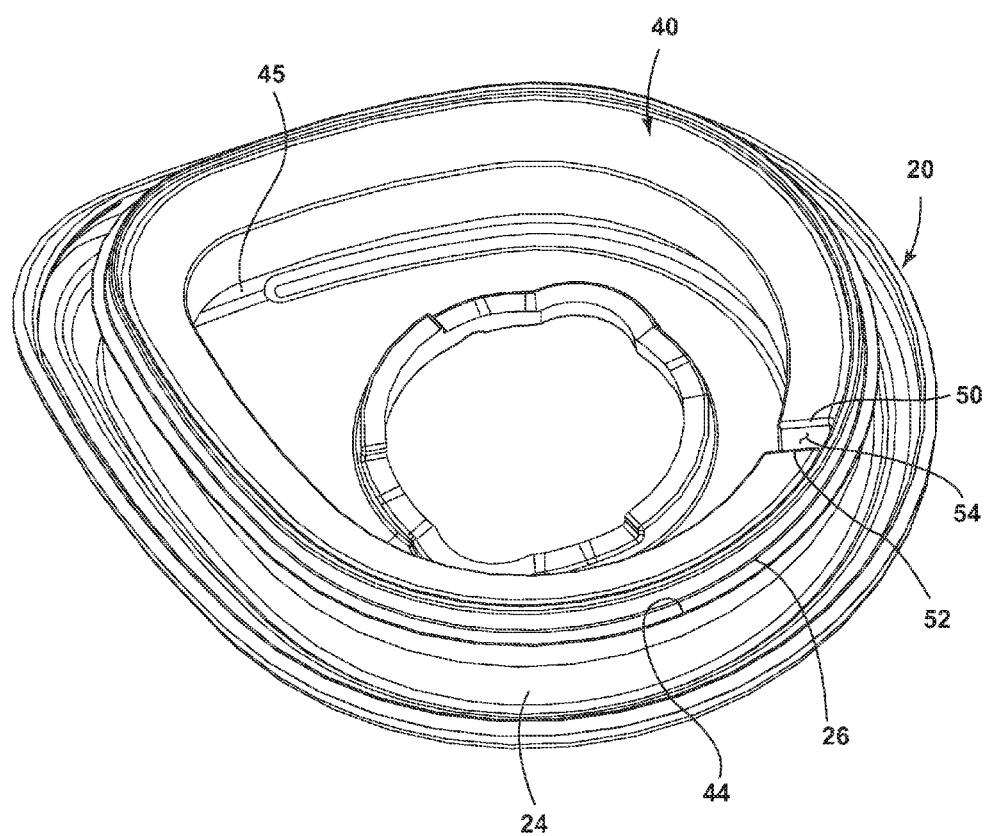
FIG. 3 is a bottom perspective view of an embodiment of a blender lid having a blender locking ring.

As shown in the embodiment depicted in FIG. 2, the lid 20 has a top surface 22 and an opposing a bottom surface 24, with the bottom surface 24 having a downwardly depending sealing wall 26. The sealing wall 26 has an outer surface 28, which corresponds to an interior surface 30 of the top opening 18 of the jar 14 and fits closely within the top opening 18. The sealing wall 26 has a flexible outwardly extending flange 32 to aid in forming a seal between the sealing wall 26 and the at least one side wall 16. A resiliently collapsible locking ring 40 fits radially inwardly from the sealing wall 26 of the lid 20, and is removably positionable within the lid 20. The resiliently collapsible locking ring 40 has an outer perimeter 42 which corresponds to an inner surface 44 of the sealing wall 26 and applies a radially outwardly directed force against the sealing wall 26 as shown in FIG. 3. When the lid 20 is used to seal the top opening 18 of the jar 14, the lid 20 is positioned over the top opening 18, with the sealing wall 26 inside the top opening 18 of the jar 14 and adjacent the interior surface 30 of the at least one sidewall 16. The outwardly directed force of the locking ring 40 against the sealing wall 26 enhances a radially outwardly directed sealing force of the sealing wall 26 against the at least one sidewall 16 to seal the lid 20 to the jar 14.

Figure 4:
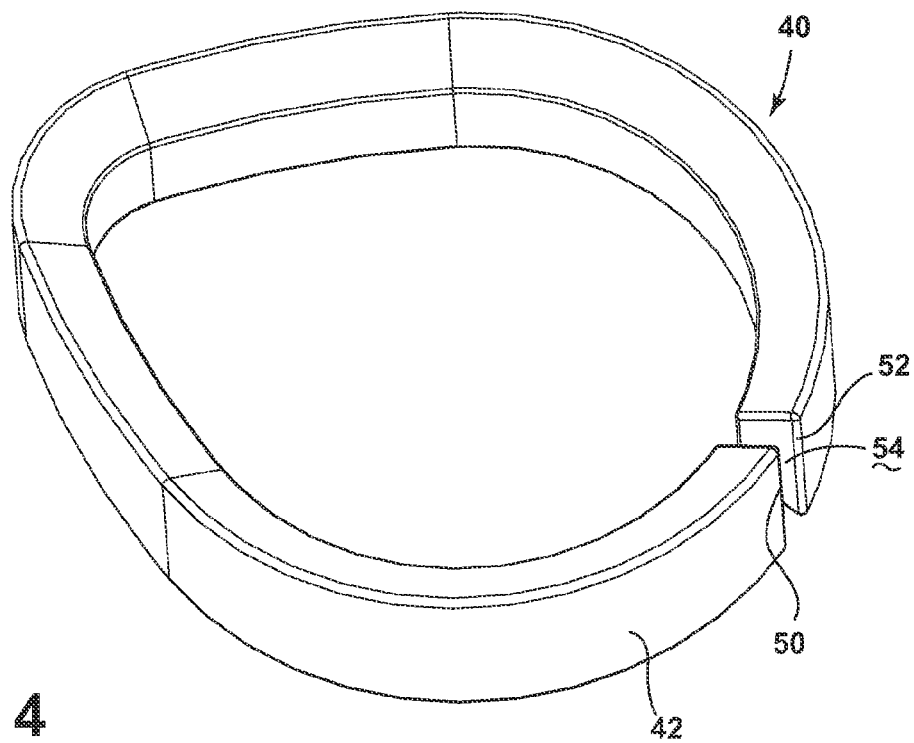
FIG. 4 is a top perspective view of an embodiment of a blender locking ring.
Figure 5:
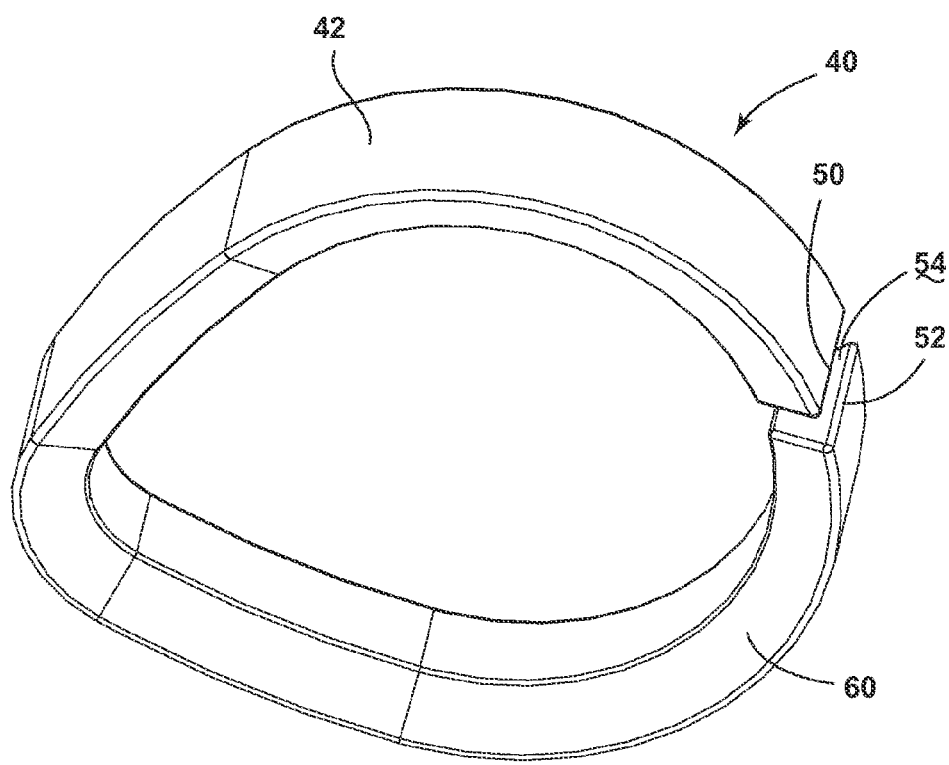
FIG. 5 is a bottom perspective view of the embodiment of a blender locking ring shown in FIG. 4.

As shown in the embodiment depicted in FIGS. 3-5, the resiliently collapsible locking ring 40 has a structure which allows it to be collapsed for insertion into a receiving portion 46 of the lid 20 radially inward from the sealing wall 26. Once positioned within the receiving portion 46, the resiliently collapsible locking ring 40 expands, thus applying the outwardly directed force against the sealing wall 26. As shown in the embodiment depicted in FIGS. 4-5, the locking ring 40 may include a first end 50 and a second end 52, that define a gap 54 about the perimeter 42 of the locking ring 40. The gap 54 in the perimeter 42 of the locking ring 40 facilitates collapse of the locking ring 40 for insertion into the receiving portion 46, but is not required. The locking ring 40 may alternatively be constructed from a material which permits collapse or bending of the locking ring 40 in order to insert the locking ring 40 into the receiving portion 46.

Figure 6:
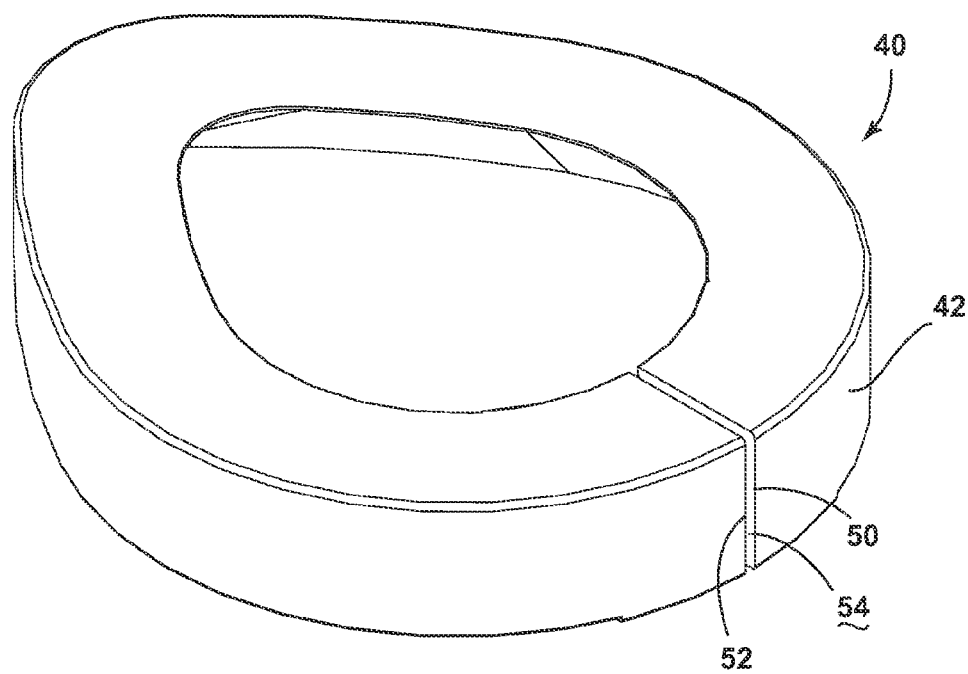
FIG. 6 is a top perspective view of another embodiment of a blender locking ring.
Figure 7:
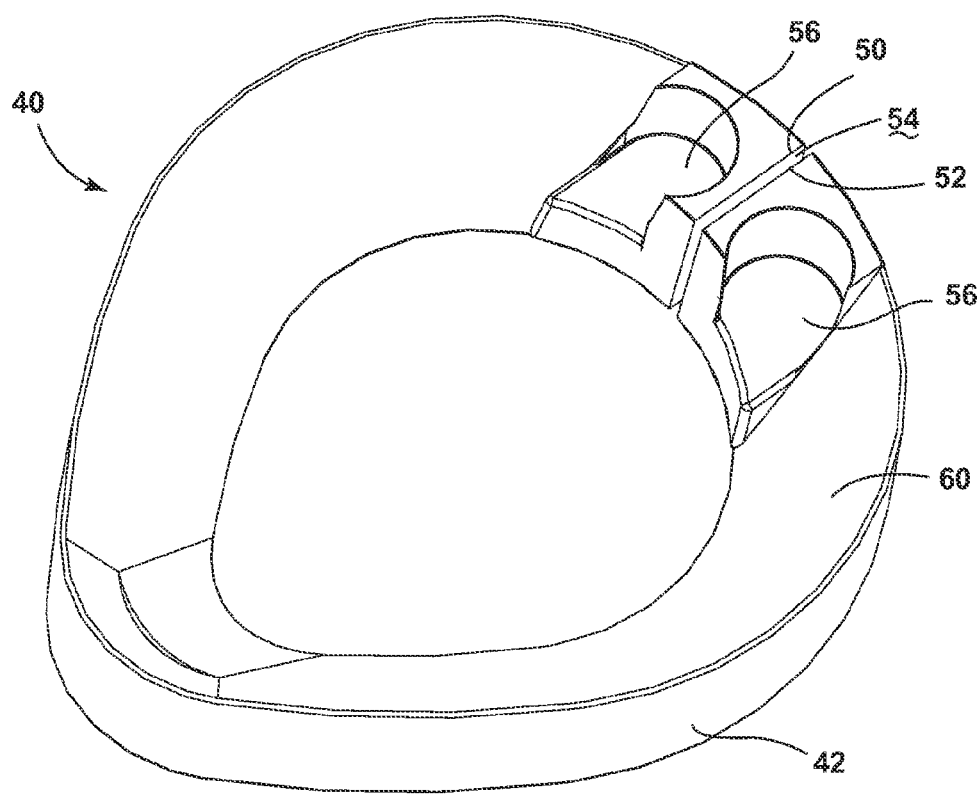
FIG. 7 is a bottom perspective view of the embodiment of a blender locking ring shown in FIG. 6.

As shown in the embodiment of the locking ring 40 depicted in FIGS. 6-7, finger tabs 56 are optionally included to aid in collapsing the locking ring 40 for insertion into the receiving portion 46 of the lid 20 and removal therefrom. Such finger tabs 56 are provided on a bottom side 60 of the locking ring 40, adjacent the gap 54. The finger tabs 56 can be squeezed together to reduce the gap 54 and to thereby collapse the locking ring 40 and reduce its circumference, thereby lessening the effort needed to insert or remove the locking ring 40 from the receiving portion 46 of the lid 20.

Figure 8:
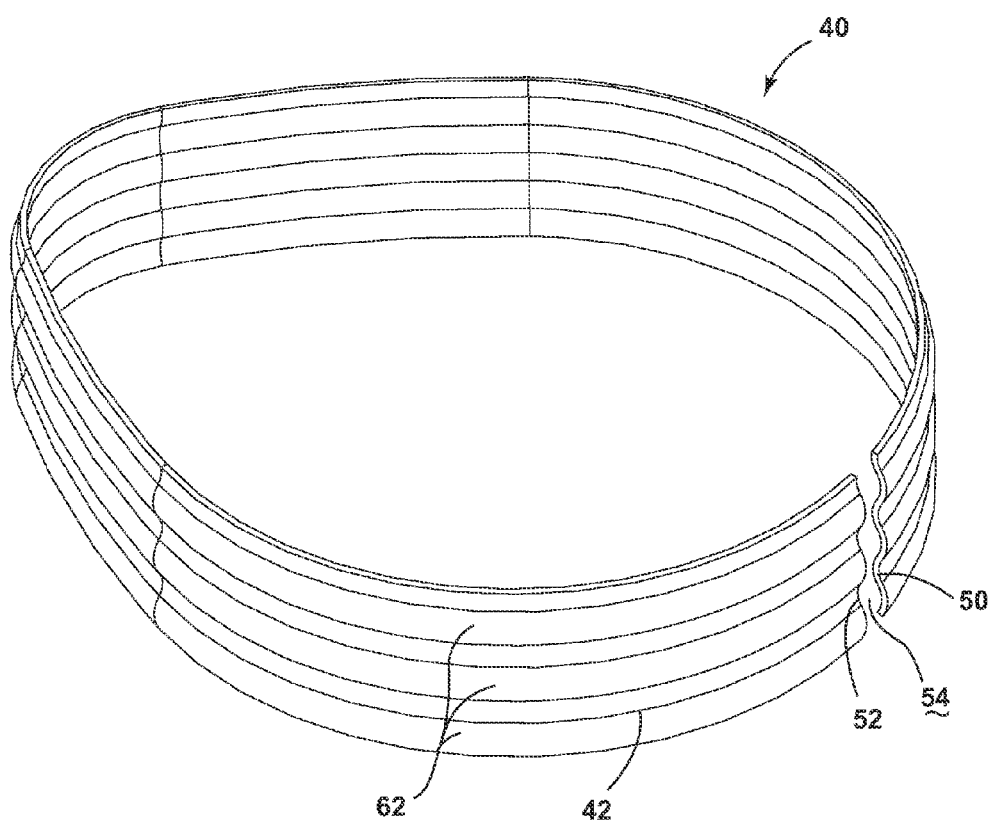
FIG. 8 is a top perspective view of another embodiment of a blender locking ring.

As shown in the embodiment of the locking ring 40 depicted in FIG. 8, the locking ring 40 may include ridges 62 around the perimeter 42. The ridges 62 aid in resilient recovery of the locking ring 40 from its collapsed to its expanded state, and provide an enhanced gripping surface about the perimeter 42 of the locking ring 40.

After the locking ring 40 is collapsed and inserted into the receiving portion 46, it is permitted to expand, applying an outwardly directed force against the sealing wall 26. When the lid 20 is used to seal the jar 14, as shown in FIG. 1, the outward pressure of the locking ring 40 on the sealing wall 26 increases the sealing pressure of sealing wall 26 against the at least one sidewall 16 of the jar 14. The sealing wall 26, as aided by the locking ring 40, preferably applies a normal force against at least one sidewall 16 of between about 12 and about 14 pounds, and enables the lid 20 to resist a removal force of up to about 4 pounds of pressure.

Figure 9:
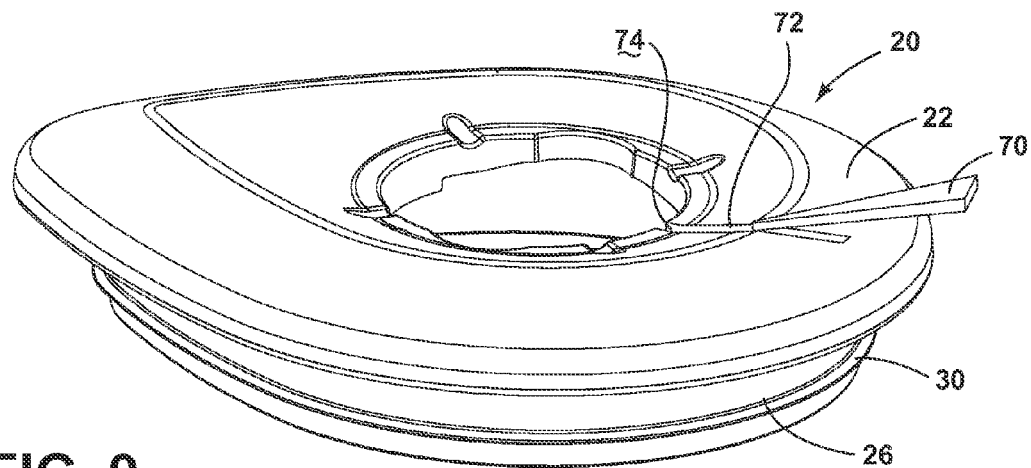
FIG. 9 is a top perspective view of an embodiment of a lid for a blender, having a slot and wedge.

As shown in the embodiment depicted in FIG. 9, to increase the outwardly directed pressure applied by the locking ring 40 to the sealing wall 26, a wedge 70 can be inserted into a slot 72 in the top surface 22 of the lid 20, between the first end 50 and the second end 52 of the locking ring 40. The slot 72 extends radially inwardly from and generally orthogonally to the sealing wall 26, on the top surface 22 of the lid 20, opposite the receiving portion 46. The slot 72 preferably does not allow access into the jar 14, and instead is enclosed and defined by a plurality of walls 74. The material of the lid 20 is preferably sufficiently flexible to permit the wedge 70 to be inserted into the slot 72 to varying depths, with the wedge 70 forcing the slot 72 to widen, widening the gap 54 between the first end 50 and the second end 52 of the locking ring 40. As the locking ring 40 is expanded in this manner, it applies a greater radially outwardly directed force to the sealing wall 26. Increasing the outwardly directed forces strengthens the seal of the lid 20 to the top opening 18 of the jar 14. The wedge 70 may be formed from any material which is capable of expanding the locking ring 40, such as a hard plastic material, metal, glass, wood, or other materials with a sufficient hardness and strength.

Figure 10:
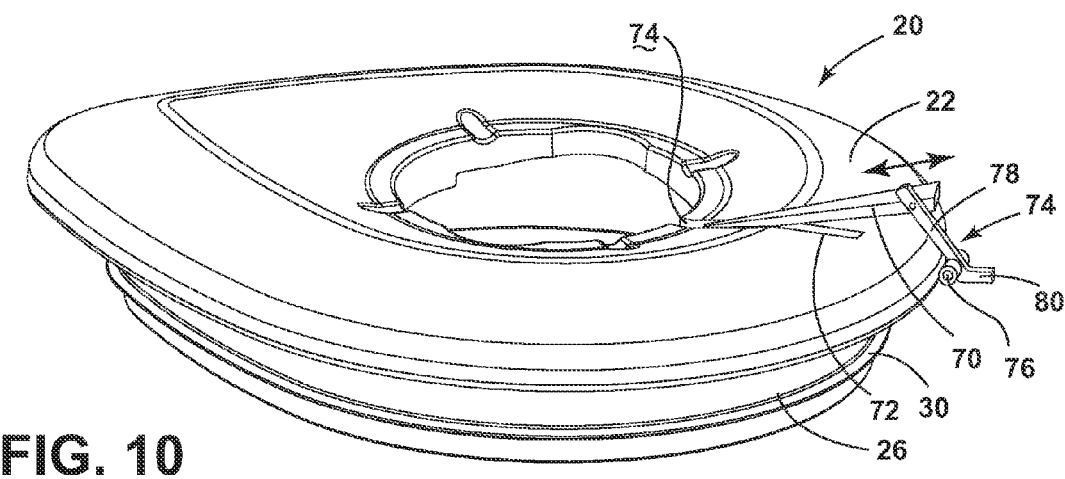
FIG. 10 is a top perspective view of another embodiment of a lid for a blender, having a lever-operated wedge, with the wedge shown in the sealing position.
Figure 11:
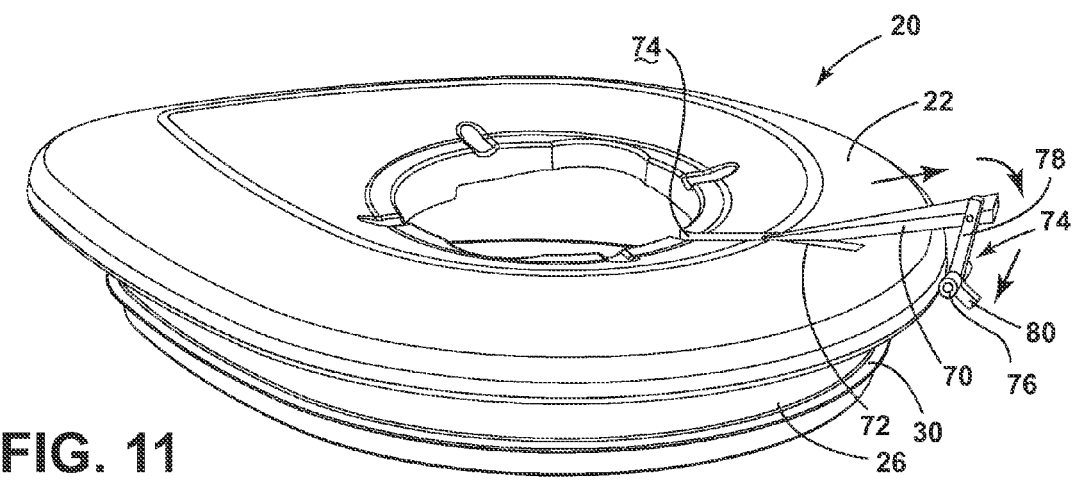
FIG. 11 is a top perspective view of the embodiment shown in FIG. 10, with the wedge shown in the release position.

As shown in FIGS. 10 and 11, to facilitate insertion of the wedge 70 into the slot 72, a lever mechanism 74 is provided. A fulcrum 76 of the lever mechanism 74 is pivotally attached to the lid 20. A load arm 78 extends from the fulcrum 76 and is operably, pivotally attached to the wedge 70. An effort arm 80 also extends from the fulcrum 76, and includes or is used as a handle for a user to insert or remove the wedge 70 from the slot 72. The lever mechanism 74 reduces the mechanical effort required to insert and remove the wedge 70 into the slot 72, and also operates to secure the wedge 70 to the lid 20. In alternative embodiments, the lever mechanism 74 may include only a single arm and the fulcrum.

In use, the blender locking ring 40 as described herein is collapsed and placed radially inwardly from the sealing wall 26 adjacent the bottom surface 24 of the lid 20. The resiliently collapsible locking ring 40 expands after insertion adjacent the bottom surface 24 of the lid 20. The lid 20 is then placed in position over the top opening 18 of the jar 14, with the sealing wall 26 inserted into the top opening 18 and forming a sealing relationship with the at least one sidewall 16 of the jar 14. The radially outwardly directed force applied by the locking ring 40 to the sealing wall 26 increases the sealing force of the sealing wall 26.

In additional embodiments, the gap 54 in the locking ring 40 is aligned with the slot 72 in the lid 20 prior to inserting the locking ring 40 into the receiving portion 46 and positioning the lid 20 over the top opening 18 of the jar 14. The wedge 70 is then inserted into the slot 72 to increase the radially outwardly directed sealing force by expanding the locking ring 40. The wedge 70 is optionally positionable by adjusting the lever mechanism 74 operably attached to the wedge 70.

The various embodiments described above are configured to ensure that the lid 20 is securely sealed in the top opening 18 of the jar 14, such that contents of the jar 14 are not thrown from the jar 14 when the food processing machine 10 is operated. The removable locking ring 40 increases the sealing pressure of the lid 20 in the top opening 18, preferably allowing for hands-free operation of the food processing machine 10. The locking ring 40 and lid 20 described herein are also easily assembled and disassembled for cleaning, storage, and use.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A food processing machine, comprising:
   a jar having a base and at least one sidewall extending upwardly from the base and defining a top opening;
   a lid having a bottom surface with a downwardly depending sealing wall and a slot in a top surface of the lid, wherein:
      the sealing wall has an outer surface which corresponds to an interior surface of the top opening; and
      the slot extends radially inwardly from, and substantially orthogonal to, the sealing wall;
   a resiliently collapsible locking ring which is operable between a collapsed and an expanded position, comprising a first end and a second end wherein:
      the first end and the second end define a gap therebetween about a perimeter of the locking ring; and
      the locking ring is removably positionable radially inward from the sealing wall, and applies a radially outwardly directed force against the sealing wall when positioned radially inwardly therefrom; and
   a wedge which is adapted for insertion into the slot to varying depths to apply pressure to the first end and the second end of the locking ring, causing an increase in the radially outwardly directed force applied by the locking ring to the sealing wall.

2. The food processing machine of claim 1, further comprising:
   a lever operably affixed to the lid and to the wedge, wherein the lever is operable to insert the wedge to a desired depth in the slot.

3. The food processing machine of claim 1, wherein the locking ring includes finger tabs to collapse the locking ring for insertion into the sealing wall of the lid.

4. The food processing machine of claim 1, wherein the locking ring includes ribs about the perimeter thereof.

5. The food processing machine of claim 1, wherein the sealing wall applies a normal force against at least one sidewall of between about 12 and about 14 pounds of pressure per square inch.

6. The food processing machine of claim 1, wherein the lid resists a removal force of up to about 4 pounds of pressure.

7. The food processing machine of claim 1, wherein the sealing wall includes a flexible flange directed outwardly therefrom to aid in forming a seal between the sealing wall and the at least one side wall.

* * * * *